(12) United States Patent
Kang

(10) Patent No.: US 10,520,576 B2
(45) Date of Patent: Dec. 31, 2019

(54) METHOD AND APPARATUS FOR PROVIDING INDOOR TRAVEL PATH BASED ON BEACON

(71) Applicant: SK Planet Co., Ltd., Gyeonggi-do (KR)

(72) Inventor: Kichon Kang, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 318 days.

(21) Appl. No.: 15/286,191

(22) Filed: Oct. 5, 2016

(65) Prior Publication Data

US 2017/0115123 A1     Apr. 27, 2017

(30) Foreign Application Priority Data

Oct. 27, 2015  (KR) .................. 10-2015-0149072
Oct. 27, 2015  (KR) .................. 10-2015-0149141

(51) Int. Cl.
| | | |
|---|---|---|
| *G01S 1/02* | (2010.01) | |
| *H04W 40/24* | (2009.01) | |
| *H04W 4/02* | (2018.01) | |
| *G06Q 30/02* | (2012.01) | |
| *G01C 21/20* | (2006.01) | |
| *H04W 4/80* | (2018.01) | |

(52) U.S. Cl.
CPC .............. *G01S 1/02* (2013.01); *G01C 21/206* (2013.01); *G06Q 30/0259* (2013.01); *H04W 4/023* (2013.01); *H04W 4/80* (2018.02); *H04W 40/244* (2013.01)

(58) Field of Classification Search
None
See application file for complete search history.

(56) References Cited

U.S. PATENT DOCUMENTS

| | | | |
|---|---|---|---|
| 2002/0174021 A1* | 11/2002 | Chu ................ | G06Q 10/063 705/7.11 |
| 2007/0001904 A1* | 1/2007 | Mendelson ......... | G01C 21/206 342/450 |

(Continued)

OTHER PUBLICATIONS

"Wayfinding Software and Bluetooth BLE Beacons" (published online at https://www.jibestream.com/blog/wayfinding-software-and-bluetooth-ble-beacons on May 21, 2015) (Year: 2015).*

*Primary Examiner* — James M Detweiler
(74) *Attorney, Agent, or Firm* — Fenwick & West LLP

(57) ABSTRACT

A method and apparatus provide an indoor travel path based on a beacon. In an embodiment, the apparatus extracts, as a target beacon, at least one beacon device corresponding to at least one destination and also extracts, as an intermediate beacon, one or more beacon devices intervening between the target beacon and a user's terminal device. Then the apparatus establishes a link connecting the target beacon and the intermediate beacon and, based on the established link, calculates one or more paths configured to start from a current location of the terminal device, to pass through the intermediate beacon, and to arrive at the target beacon. Further, the apparatus selects a travel path having the minimum number of link hops from among the calculated paths and offers it to the terminal device.

6 Claims, 11 Drawing Sheets

(56) References Cited

U.S. PATENT DOCUMENTS

| | | | |
|---|---|---|---|
| 2011/0225068 A1* | 9/2011 | Figueroa | G06Q 30/0601 705/27.1 |
| 2012/0044265 A1* | 2/2012 | Khorashadi | G01C 21/206 345/641 |
| 2014/0163867 A1* | 6/2014 | Fernandez | G01C 21/206 701/425 |
| 2016/0259027 A1* | 9/2016 | Said | H04W 4/33 |

* cited by examiner

METHOD AND APPARATUS FOR PROVIDING INDOOR TRAVEL PATH BASED ON BEACON

TECHNICAL FIELD

The present invention relates generally to a method and apparatus for providing an indoor travel path based on a beacon and, more particularly, to a method and apparatus for establishing links between a plurality of beacons, calculating an optimal travel path to reach a destination on the basis of the number of link hops, and then offering the optimal travel path to a user. Additionally, this invention relates to a method and apparatus for collecting marketing information of respective individual stores located within a specific area such as a shopping mall, a department store, etc., forming links between a plurality of beacons installed in such stores, calculating a travel path in view of the collected marketing information, and offering the calculated travel path to a user.

BACKGROUND

Details disclosed in this section merely offers background information regarding embodiments of the present invention. No determination has been made, and no assertion is made, as to whether any of the below might be applicable as prior art with regard to the present invention.

With the remarkable development of a mobile communication network and related technologies, today's mobile communication devices have outgrown a typical category of simple communication devices or information providing devices and are now evolving into total entertainment devices.

Such a mobile communication device often has a function of short range communication such as NFC (Near Field Communication) or Bluetooth as well as a traditional communication function using a mobile communication network.

By the way, NFC covers a relatively narrower communication range and needs an additional wireless chip, whereas Bluetooth covers a relatively wider communication range and is inherently applied to most of recent mobile communication devices. In addition, a great variety of communication services using Bluetooth are developed and launched.

Meanwhile, a new service for offering various kinds of information to a user's mobile device by utilizing a beacon based on Bluetooth communication is being developed and studied.

For example, a beacon-based content provision service is used. This service is based on a beacon device installed in a store. The beacon device emits a periodic signal by using an electromagnetic wave or sound and thereby triggers a specific application of a neighboring mobile communication device. Using this service, content providers may provide a great variety of contents associated with publicity, advertisement, finance, banking, payment, game, and the like.

As the utilization of such beacon services increases, stores that offer their specific beacon services through beacon devices equipped therein are also increasing.

Meanwhile, in a certain area full of many stores, e.g., a shopping mall, a department store, a shopping street, etc., an indoor navigation service is useful to smart phone users who want to obtain information about an optimal travel path to a desired store.

This indoor navigation service, however, requires much cost of construction. Therefore, a way of providing another indoor navigation service by utilizing the existing beacon devices is needed.

Additionally, a typical beacon service is merely and forcedly offered to a user's terminal device within a particular area such as a shopping mall, a department store, or a shopping street. This may often add to a user's confusion as to what to select from among numerous beacon services offered randomly. Further, even though a desired beacon service is received, a user may have some difficulty in knowing the location of available store.

Therefore, techniques to extract a recommendable store in view of collected marketing information of stores and to induce a user to use a desired beacon service through an indoor navigation service are needed.

SUMMARY

Accordingly, in order to address the aforesaid or any other issue, the present invention provides a method and apparatus for extracting a target beacon corresponding to a destination, extracting intermediate beacons intervening between the target beacon and a user terminal device, establishing links connecting the target beacon and the intermediate beacons, calculating, based on the established links, paths that start from a current location of the user terminal device, pass through the intermediate beacons, and arrive at the target beacon, and selecting a travel path having the minimum number of link hops from among the calculated paths.

Additionally, the present invention provides a method and apparatus for determining an optimal travel path, when there are two or more target places to be visited, by further considering a visit order of target places based on marketing information of the target places.

The present invention is not limited to the above object, and any other object, even though not mentioned herein, may be well understood from the following description.

According to an embodiment of the present invention, a method for providing a travel path at a path management server may include steps of extracting, as a target beacon, at least one beacon device corresponding to at least one destination; extracting, as an intermediate beacon, one or more beacon devices intervening between the target beacon and a terminal device; establishing a link connecting the target beacon and the intermediate beacon; based on the established link, calculating one or more paths configured to start from a current location of the terminal device, to pass through the intermediate beacon, and to arrive at the target beacon; and selecting a travel path having the minimum number of link hops from among the calculated paths.

This method may further include steps of collecting one or more beacon signals received by the terminal device; selecting a departure beacon from among beacon devices emitting the collected beacon signals; and estimating the current location of the terminal device at a location of the selected departure beacon. In this method, the step of selecting the departure beacon may include selecting, as the departure beacon, a beacon device that emits a beacon signal received with the greatest received signal strength by the terminal device. Also, this method may further include step of receiving information about the at least one destination from the terminal device.

Additionally, this method may further include steps of receiving, from the terminal device, a visit list containing information about one or more stores to be visited by a user; and determining, as the at least one destination, at least one store in the received visit list. Also, this method may further include step of in case two or more beacon devices are extracted as the target beacons, defining the order of the target beacons. In this method, the step of establishing the link may be performed considering geographical information between the target beacon and the intermediate beacon.

Additionally, this method may further include step of assigning a weight value to the established link in view of a physical distance between the target beacon and the intermediate beacon, wherein the step of selecting the travel path may be performed considering the assigned weight value. Also, in this method, the step of extracting as a target beacon may include steps of collecting marketing information about one or more stores; based on the collected marketing information, extracting one or more stores to be visited by a user; defining the order of the extracted stores; and extracting, as the target beacon, one or more beacon devices corresponding to the extracted stores, and wherein the step of calculating the one or more paths is performed considering the defined order of the extracted stores.

Additionally, in this method, the step of extracting the one or more stores may include step of, when beacon identification information of a beacon signal corresponding to a specific beacon device predetermined as a departure beacon is received from the terminal device, estimating the current location of the terminal device at a location of the specific beacon device.

Meanwhile, this method for providing the travel path may be implemented in the form of a program recorded on a computer-readable non-transitory storage medium.

According to an embodiment of the present invention, a path management server may include a communication module configured to transmit or receive data to or from a terminal device through a communication network; and a control module configured to control the communication module and further configured to extract, as a target beacon, at least one beacon device corresponding to at least one destination, to extract, as an intermediate beacon, one or more beacon devices intervening between the target beacon and the terminal device, to establish a link connecting the target beacon and the intermediate beacon, based on the established link, to calculate one or more paths for starting from a current location of the terminal device, passing through the intermediate beacon, and arriving at the target beacon, and to select a travel path having the minimum number of link hops from among the calculated paths.

In the path management server, the control module may be further configured to collect, through the communication module, one or more beacon signals received by the terminal device, to select a departure beacon from among beacon devices emitting the collected beacon signals, and to estimate the current location of the terminal device at a location of the selected departure beacon. Also, the control module may be further configured to select, as the departure beacon, a beacon device that emits a beacon signal received with the greatest received signal strength by the terminal device. And also, the control module may be further configured to receive information about the at least one destination from the terminal device through the communication module.

Additionally, in the path management server, the control module may be further configured to receive, from the terminal device through the communication module, a visit list containing information about one or more stores to be visited by a user, and to determine, as the at least one destination, at least one store in the received visit list. Also, the control module may be further configured to, in case two or more beacon devices are extracted as the target beacons, define the order of the target beacons. And also, the control module may be further configured to establish the link by considering geographical information between the target beacon and the intermediate beacon.

Additionally, the path management server may further include a memory module configured to store information about a physical distance between the target beacon and the intermediate beacon, wherein the control module may be further configured to assign a weight value to the established link in view of the physical distance, and to select the travel path by considering the assigned weight value. Also, the control module may be further configured to extract one or more stores to be visited by a user of, based on marketing information about one or more stores collected through the communication module, to define the order of the extracted stores, to extract, as the target beacon, one or more beacon devices corresponding to the extracted stores, and to calculate the one or more paths by considering the defined order of the extracted stores.

Additionally, the control module may be further configured to, when beacon identification information of a beacon signal corresponding to a specific beacon device predetermined as a departure beacon is received from the terminal device, estimate the current location of the terminal device at a location of the specific beacon device.

According to this invention, the path management server may offer an optimal indoor travel path to a user who is staying at a specific indoor area such as a shopping mall or a department store, by utilizing beacon devices installed at stores deployed in the specific indoor area.

In addition, if there are two or more beacon devices extracted as target beacons, the path management server may define the order of the target beacons in view of a visit list that contains information about stores to be visited. This may increase a user's satisfaction and convenience.

Further, the path management server may consider marketing information of respective individual stores located within the specific area when establishing the travel path. This may not only induce user's reasonable consumption, but also promotes marketing effects of such stores.

Other various advantages and effects will be disclosed explicitly or implicitly in embodiments of this invention to be described below in detail.

DETAILED DESCRIPTION

Figure 1:
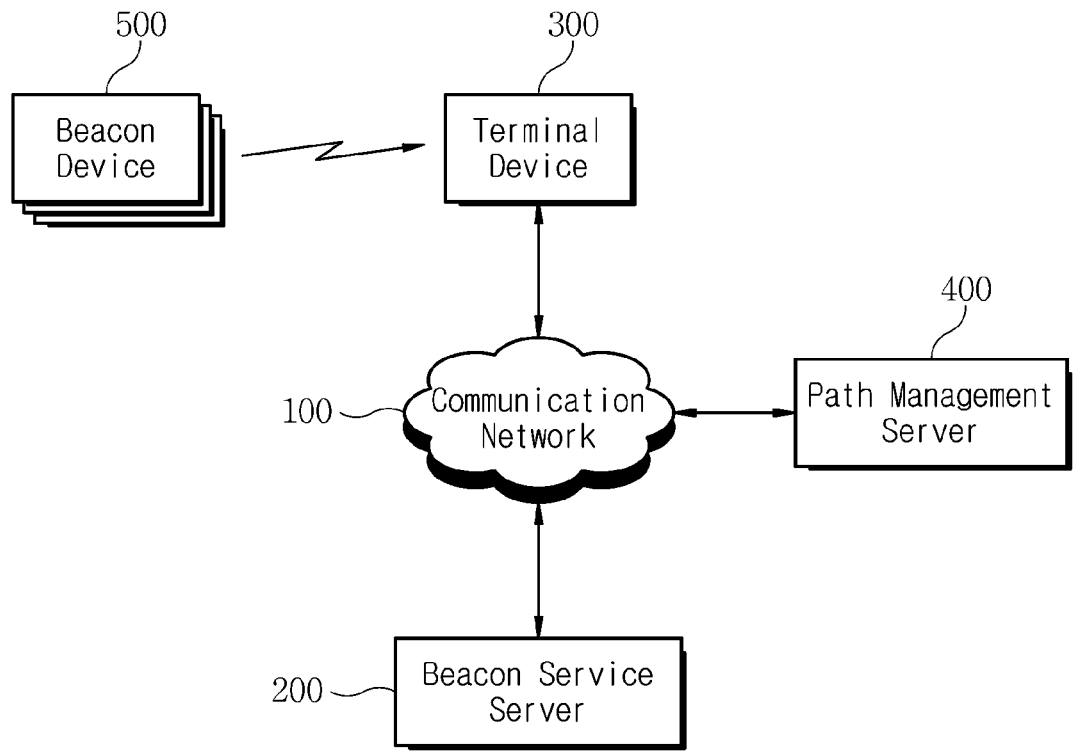
FIG. 1 is a diagram illustrating a system for providing a travel path according to an embodiment of the present invention.

Now, embodiments of the present invention will be described with reference to the accompanying drawings.

In the following description and the accompanying drawings, however, well known techniques may not be described or illustrated in detail to avoid obscuring the subject matter of the present invention. Through the drawings, the same or similar reference numerals denote corresponding features consistently.

The terms and words used in the following description, drawings and claims are not limited to the bibliographical meanings and are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

The expression "1", "2", "first", or "second" used in various embodiments of this disclosure may modify various elements of such embodiments but does not limit the corresponding elements. The above expressions do not limit the sequence and/or importance of the elements but may be used for distinguishing one element from other elements. For example, a first device and a second device indicate different devices although both of them are devices. Meanwhile, without departing from the scope of the present disclosure, a first structural element may be referred to as a second structural element. Similarly, the second structural element also may be referred to as the first structural element.

When it is stated that a certain element is "coupled to" or "connected to" another element, the element may be directly coupled or connected to another element, or a new element may exist between both elements. In contrast, when it is stated that a certain element is "directly coupled to" or "directly connected to" another element, a new element does not exist between both elements.

The terms used in describing various embodiments of this disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include", "comprise", and "have" as well as derivatives thereof, mean inclusion without limitation.

Embodiments within the scope of the present invention include computer-readable media for carrying or having computer-executable instructions or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links (of possibly different speeds) that enable the transport of electronic data between computer systems and/or modules (e.g., hardware and/or software modules). When information is transferred or provided over a network or another communications connection (either hardwired, wireless, or a combination of hardwired or wireless) to a computer system, the connection is properly viewed as a computer-readable medium. Computer-executable instructions include, for example, instructions and data which cause a general-purpose computer system or special-purpose computer system to perform a certain function or group of functions. The computer executable instructions may be, for example, binaries, intermediate format instructions such as assembly language, or even source code.

Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Hereinafter, a service using beacon technology according to this invention will be described on the basis of data communication technology using Bluetooth low energy (BLE) technique.

While near field communication (NFC) technique is available only within several centimeters, Bluetooth technique is available within the range of several meters and is thus widely utilized in various fields. Further, unlike NFC, Bluetooth technique requires no tagging onto a reader and allows the delivery of data in response to a mere approach or passage to or through a beacon device. In addition, Bluetooth technique is helpful in reading indoor locations and delivering customized data.

This invention is, however, not limited to Bluetooth or BLE only and may further or alternatively employ any other short range communication technique, based on a personal area network (PAN), such as Zigbee, ultra wideband (UWB), ANT, Wi-Fi, NFC, or the like.

Now, various embodiments of the present invention will be described with reference to the accompanying drawings.

At the outset, a system for providing a travel path according to an embodiment of the present invention will be described.

FIG. 1 is a diagram illustrating a system for providing a travel path according to an embodiment of the present invention.

Referring to FIG. 1, the travel path provision system may include a communication network 100, a beacon service server 200, a terminal device 300, a path management server 400, and one or more beacon devices 500.

Although the terminal device 300 transmits or receives data to or from the beacon devices 500 through BLE communication technique, this is exemplary only and not to be construed as a limitation. As mentioned above, any other short range communication technique may be alternatively applied.

The terminal device 300 is connected to and interworks with the path management server 400 through the communication network 100.

Hereinafter, each element will be described in detail with reference to FIG. 1. The communication network 100 performs a function to deliver data for transmission and reception of data among the beacon service server 200, the terminal device 300, and the path management server 400. The communication network 100 may use wireless communication technique such as, but not limited to, WLAN (Wireless Local Access Network), Wi-Fi, Wibro, Wimax, HSDPA (High Speed Downlink Packet Access), LTE (Long Term Evolution), LTE-A (LTE-Advanced), or the like. Alternatively or additionally, depending on system types, the communication network 100 may use wired communication technique such as Ethernet, xDSL (ADSL, VDSL), HFC (Hybrid Fiber Coaxial cable), FTTC (Fiber To The Curb), FTTH (Fiber To The Home), or the like.

Additionally, the communication network 100 includes a plurality of access networks (not shown) and a core network (not shown), and may further include an external network, e.g., Internet (not shown). Here, the access network is to perform wired/wireless communication with the terminal device 300 and may be formed of a plurality of base stations, also referred to as BTS (Base Transceiver Station), NodeB, or eNB (eNodeB or evolved Node B), and controllers such as BSC (Base Station Controller) and RNC (Radio Network Controller). Additionally, instead of such a base station that includes a digital signal processor and a radio signal processor, a plurality of radio units (not shown) corresponding to the radio signal processor may be disposed respectively at a plurality of regions and connected to a centralized digital unit (not shown) corresponding to the digital signal processor.

The core network which forms a mobile network together with the access network performs a function to connect the access network and the external network such as Internet.

The core network is a network system that performs main functions for a mobile communication service such as mobility control and switching between the access networks. Namely, the core network performs circuit switching or packet switching and further manages and controls a packet flow in the mobile network.

In addition, the core network may manage mobility between frequencies, control traffic therein and in the access network, and control interworking with other network such as Internet. The core network may be formed of SGW (Serving GateWay), PGW (PDN GateWay), MSC (Mobile Switching Center), HLR (Home Location Register), MME (Mobile Mobility Entity), HSS (Home Subscriber Server), and/or the like.

The Internet is a world common network through which information is exchanged according to TCP/IP protocol. The Internet is connected to the terminal device 300 and may deliver information, offered from the terminal device 300, to the path management server 400 through the core network and the access network. Similarly, the Internet may deliver information, offered from the path management server 400, to the terminal device 300 through the core network and the access network. This is, however, exemplary only and not to be construed as a limitation. Alternatively, the path management server 400 may be integrated with the core network.

In addition to the above-discussed communication technique, any other communication technique well known in the art or to be developed may be used for this invention.

The beacon service server 200 may manage a plurality of beacon devices, receive a service request from the terminal device 300, and provide information corresponding to the requested service.

Particularly, the beacon service server 200 may manage a beacon service corresponding to a beacon signal emitted by the beacon device 500 installed in one or more stores located in a specific area such as a department store, a shopping mall, and the like. This beacon service may be, for example, but not limited to, a certain event such as a sales event or a marketing-associated service.

The beacon service server 200 may receive an input of marketing information of one or more stores located in a department store, a shopping mall, etc. from the terminal device 300 or any other terminal or a manager of the department store or shopping mall. The beacon service server 200 may store the received marketing information.

Further, the beacon service server 200 may transmit the stored marketing information to the path management server 400. Then, based on such marketing information, the path management server 400 may calculate a travel path.

Meanwhile, even though the beacon service server 200 and the path management server 400 are described as separate elements in this disclosure, this is exemplary only. The beacon service server 200 and the path management server 400 may be integrated with each other to form a single server as well as separately implemented as respective individual servers. Namely, functions of the beacon service server 200 and the path management server 400 may be executed by a single integrated server.

The terminal device 300 refers to a user's device capable of transmitting and receiving various data through the communication network 100 in response to user's manipulations. The terminal device 300 may perform voice or data communication through the communication network 100, transmit or receive information to or from the path management server 400 through the communication network 100, and receive information from the beacon device 200 by means of beacon-based communication. For this, the terminal device 300 may have a memory for storing programs and protocols for transmitting, receiving and processing a beacon signal, a microprocessor for executing and controlling various programs, and the like.

The terminal device 300 may perform the access to any application provider (not shown) such as App Store on the communication network 100, receive a beacon service application from the application provider, and install the beacon service application for receiving a beacon signal and showing content corresponding to the beacon signal. The terminal device 300 may execute the beacon service application, extract beacon identification information from the beacon signal, transmit the extracted information to the path management server 400, receive specific content (e.g., a discount coupon, a membership card benefit, etc.) mapped to the beacon identification information from the path management server 400, and offer the received content to a user.

Particularly, the terminal device 300 may transmit, to the path management server 400, destination information and/or departure information, inputted or set by a user, or a visit list including information about stores, a user desires to visit, or including a shopping article list a user desires. Also, after the path management server 400 calculates and selects a travel path on the basis of such information transmitted by the terminal device 300, the terminal device 300 may receive information about the travel path from the path management server 400 and then offer the received information to a user.

Further, when a beacon signal is received from the beacon device 500, the terminal device 300 may transmit beacon identification information contained in the received beacon signal to the path management server 400.

The terminal device 300 may be implemented in various forms. For example, the terminal device 300 disclosed herein may be a mobile device such as a smart phone, a tablet PC, a PDA (Personal Digital Assistant), a PMP (Portable Multimedia Player), an MP3 player, and the like, or a stationary device such as a smart TV, a desktop computer, and the like.

Additionally, according to a recent trend of convergence in digital devices, a great variety of mobile devices or their equivalences may be used as the terminal device 300 in the present invention. Furthermore, any device that allows a beacon service application to be downloaded and installed may be used as the terminal device 300 in embodiments of this invention.

The path management server 400 may manage the beacon devices 500, receive a request for a specific service from the terminal device 300, and provide information associated with or required for the requested service.

The path management server 400 may determine at least one destination.

Specifically, the determined destination may be received from the terminal device 300. Additionally or alternatively, the path management server 400 may receive a visit list from the terminal device 300, extract at least one store to be visited on the basis of information contained in the received visit list, and determine the extracted store as a destination.

Herein, the visit list refers to a list that contains information about one or more stores a user will visit. This information about stores may include a brand name of a store, a store name, and/or an article sold by a store. Namely, a user may create list information from store names such as 'Store A', 'Store B', 'Store C', etc. or create list information from articles such as cosmetics, snack, t-shirt, and the like.

When receiving the visit list including information such as store names or articles, the path management server 400 may extract, from the received visit list, specific stores corresponding to the store names or selling the articles.

After at least one destination is determined from the extracted stores, the path management server 400 extracts at least one beacon device, as at least one target beacon, corresponding to the determined at least one destination.

Additionally, the path management server 400 extracts one or more beacon devices, as one or more intermediate beacons, intervening between the at least one target beacon and the terminal device 300, and then establishes links connecting the at least one target beacon and the one or more intermediate beacons. Further, based on the links, the path management server 400 calculates one or more paths to reach the at least one target beacon from the terminal device 300 through the one or more intermediate beacons.

In case there are two or more target beacons, the order of visit may be defined in the extracted target beacons. Namely, if there are two or more stores a user will visit, a visit order of stores may be defined.

Additionally, the path management server 400 selects a travel path having the minimum number of hops from among the calculated one or more paths, then transmits information about the selected travel path to the terminal device 300, which may offer this information to a user.

In this disclosure, the target beacon refers to a beacon device corresponding to a specific store a user will visit, and the intermediate beacon refers to a beacon device located on a specific path a user has to pass through in order to reach the specific store.

Meanwhile, a current location of the terminal device 300 may be estimated as the location of a departure beacon. Namely, the path management server 400 may collect, from the terminal device 300, one or more beacon signals received by the terminal device 300 and then select the departure beacon from among beacon devices emitting the beacon signals. In this case, considering the received signal strength of each beacon signal received by the terminal device 300, a beacon device that emits a beacon signal having the greatest received signal strength may be selected as the departure beacon.

Additionally, the above-mentioned links between the target beacon(s) and the intermediate beacon(s) may be established by further considering geographic information between the target beacon(s) and the intermediate beacon(s).

For example, if there is an obstacle such as a wall between the target beacon A and the intermediate beacon B, no path is available therebetween. Thus, the link may not be established between the target beacon A and the intermediate beacon B.

Namely, when establishing the link, any information about geographic environments around target beacons and intermediate beacons or other information such as pedestrian passages may be further considered.

Further, as discussed above, the travel path may be selected depending on the hop number. However, even though the hop number is small, an actual physical distance may be long. In this case, the selected travel path depending on the hop number only may not be the shortest path.

Therefore, in order to select the actually shortest path, a weight value may be assigned to each established link on the basis of a physical distance between respective beacons. For example, the longer the physical distance is, the higher weight value may be assigned.

In this case, each available path formed of one or more links not only has a hop number corresponding to the number of links, but also has a weight value assigned to each link. Therefore, all available paths are compared with each other by summing up all weight values assigned to links in each path rather than by merely counting the hop number of each path. As the result of comparison, a certain path having the lowest sum of weight values is selected as the travel path corresponding to the actually shortest path. This result is then transmitted to the terminal device 300.

Meanwhile, according to another embodiment, the path management server 400 may collect marketing information regarding one or more stores.

Such marketing information may be received from the beacon service server 200, or the path management server 400 may directly collect such marketing information from a manager of a shopping mall, a department store, etc. or from each store.

After collecting marketing information, the path management server 400 extracts, based on the collected marketing information, one or more stores a user will visit. This extraction may be performed when beacon identification information of a beacon signal corresponding to the beacon device 500 predetermined as a departure beacon is received from the terminal device 300.

Namely, if it is determined that the terminal device 300 arrives at the beacon device 500 predetermined as a departure beacon, the path management server 400 may extract one or more stores a user will visit.

For example, if a beacon device installed at an entrance of a shopping mall or a department store is determined as a departure beacon, the terminal device 300 may receive a beacon signal of the departure beacon when passing through the entrance. Then the terminal device 300 may transmit the beacon identification information corresponding to the received beacon signal to the path management server 400. Therefore, the path management server 400 may recognize the arrival of the terminal device 300 and then extract one or more stores a user will visit.

Additionally, if the beacon identification information of the departure beacon is received from the terminal device 300, the path management server 400 may estimate the current location of the terminal device 300 from the location of the departure beacon and then perform the subsequent operation process.

However, if the terminal device 300 has already entered a department store or a shopping mall, or if a departure beacon has not determined yet, or if the terminal device 300 moves from one floor to another floor, it is difficult to estimate the current location of the terminal device 300 by means of the above-discussed method.

Therefore, the path management server 400 needs another method for identifying the current location of the terminal device 300. For example, considering that the terminal device 300 receives continuously a beacon signal from one or more neighboring beacon devices 500, while moving, and transmits beacon identification information contained in the received beacon signal to the path management server 400, it may be used for location estimation or tracking.

Namely, the terminal device 300 may transmit in real time the beacon identification information corresponding to the received one or more beacon signals to the path management server 400, which may collect such beacon identification information. Then, based on the collected identification information, the path management server 400 may select a departure beacon from among the beacon devices 500 and estimate the current location of the terminal device 300 from the selected departure beacon location.

If the terminal device 300 transmits two or more beacon signals to the path management server 400, the beacon device 500 that transmits a beacon signal having the greatest received signal strength may be selected as a departure beacon. Then the location of the selected departure beacon may be regarded as the location of the terminal device 300.

If the terminal device 300 receives a beacon signal having greater received signal strength, this means that the beacon device 500 emitting the beacon signal is closer to the terminal device 300. Therefore, in order to minimize errors in location estimation or tracking, the received signal strength of beacon signals may be used favorably for identifying the current location of the terminal device 300.

After extracting one or more stores a user will visit on the basis of the collected marketing information, the path management server 400 may determine a visit order of the extracted stores, i.e., the order of stores a user will visit.

In this case, the path management server 400 may extract one or more stores on the basis of the marketing information and then determine the visit order. However, in order to meet a user's request and raise the satisfaction, the path management server 400 may receive, from the terminal device 300, a visit list including information regarding one or more stores selected by a user, extract one or more stores for a user's visit by further considering the received visit list, and determine the visit order.

Herein, the visit list refers to a list that contains information about one or more stores a user will visit. This information about stores may include a brand name of a store, a store name, and/or an article sold by a store. Namely, a user may create list information from store names such as 'Store A', 'Store B', 'Store C', etc. or create list information from articles such as cosmetics, snack, t-shirt, and the like.

When receiving the visit list including information such as store names or articles, the path management server 400 may extract, by considering the received visit list together with marking information, specific stores corresponding to the store names or selling the articles and then determine the visit order.

After one or more stores are extracted and also the visit order thereof is determined, the path management server 400 extracts one or more beacon devices 500, as target beacons, corresponding to the extracted one or more stores. These beacon devices corresponding to the stores may be installed at the inside or outside of the stores.

Meanwhile, as discussed above, the path management server 400 that extracts one or more beacon devices, as intermediate beacons, intervening between the extracted target beacon and the terminal device 300 may establish links connecting the target beacon and the intermediate beacons.

As also mentioned above, the current location of the terminal device 300 may be estimated from the location of a departure beacon.

Further, the target beacon refers to the beacon device 500 corresponding to a specific store a user will visit, and the intermediate beacon refers to the beacon device 500 located on a specific path a user has to pass through to reach the specific store.

Additionally, the above-mentioned links between the target beacon(s) and the intermediate beacon(s) may be established by further considering geographic information between the target beacon(s) and the intermediate beacon(s).

For example, if there is an obstacle such as a wall between the target beacon A and the intermediate beacon B, no path is available therebetween. Thus, the link may not be established between the target beacon A and the intermediate beacon B.

Namely, when establishing the link, any information about geographic environments around target beacons and intermediate beacons or other information such as pedestrian passages may be further considered.

Based on such links, the path management server 400 may calculate one or more paths for starting from the current location of the terminal device 300, passing through one or more intermediate beacons, and reaching one or more target beacons. Then, among the calculated paths, the path management server 400 may select a travel path having the minimum number of hops.

However, as discussed above, even though the hop number is small, an actual physical distance may be long. Namely, the selected travel path depending on the hop number only may not be the shortest path.

Therefore, in order to select the actually shortest path, a weight value may be assigned to each established link on the basis of a physical distance between respective beacons. For example, the longer the physical distance is, the higher weight value may be assigned.

In this case, each available path formed of one or more links has a weight value assigned to each link as well as a hop number corresponding to the number of links. By comparing all available paths with each other in view of sum of weight values, a certain path having the lowest sum of weight values is selected as the travel path and then resultant information is offered to the terminal device 300.

Additionally, the path management server 400 may play the same role as the beacon service server 200. This means that the beacon service server 200 and the path management server 400 may be integrated with each other to form a single entity.

Of course, as discussed in this embodiment, separate individual servers are possible.

In view of hardware, the path management server 400 according to an embodiment of this invention has the same configuration as a typical web server or network server. However, in view of software, the path management server 400 includes a program module having codes written in computer languages such as C, C++, Java, Visual Basic, Visual C, and the like.

Meanwhile, a memory unit equipped in each apparatus disclosed herein is configured to store information in such an apparatus. In various embodiments, the memory unit is a computer-readable storage medium. In one embodiment, the memory unit may be a volatile memory unit. In another embodiment, the memory unit may be a nonvolatile memory unit. In some embodiments, the memory unit or storage unit may be a hard disk, an optical disk, and/or any other mass storage device.

In addition, the term "module" used herein may refer to a component or device which is formed of software, hardware, or combination thereof, and performs certain tasks. A module may be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Although this description and drawings illustrate exemplary device elements, the subject matters and functional operations disclosed herein may be implemented by different type digital electronic circuits or implemented by computer software, firmware or hardware including a structure disclosed herein and structural equivalent thereof, or any combination thereof. The subject matters disclosed herein may be implemented by at least one computer program product, namely at least one module regarding computer program commands encoded on a program storage medium so as to control the operation of a device according to this invention or allow execution thereby. A computer-readable medium may be a machine-readable storage device, a machine-readable storage board, a memory device, a machine-readable composition of material affecting wave-type signaling, or a combination thereof.

The beacon device 500 refers to a device that transmits periodically beacon signals for a typical beacon service. This beacon signal may contain beacon identification information, such as device information or location information, allocated to the beacon device 500. Such beacon identification information is the basis used for the terminal device 300 to use a beacon service.

Heretofore, the travel path provision system according to an embodiment of the present invention is described in detail.

Now, the above-discussed beacon service server 200 will be described in detail.

Figure 2:
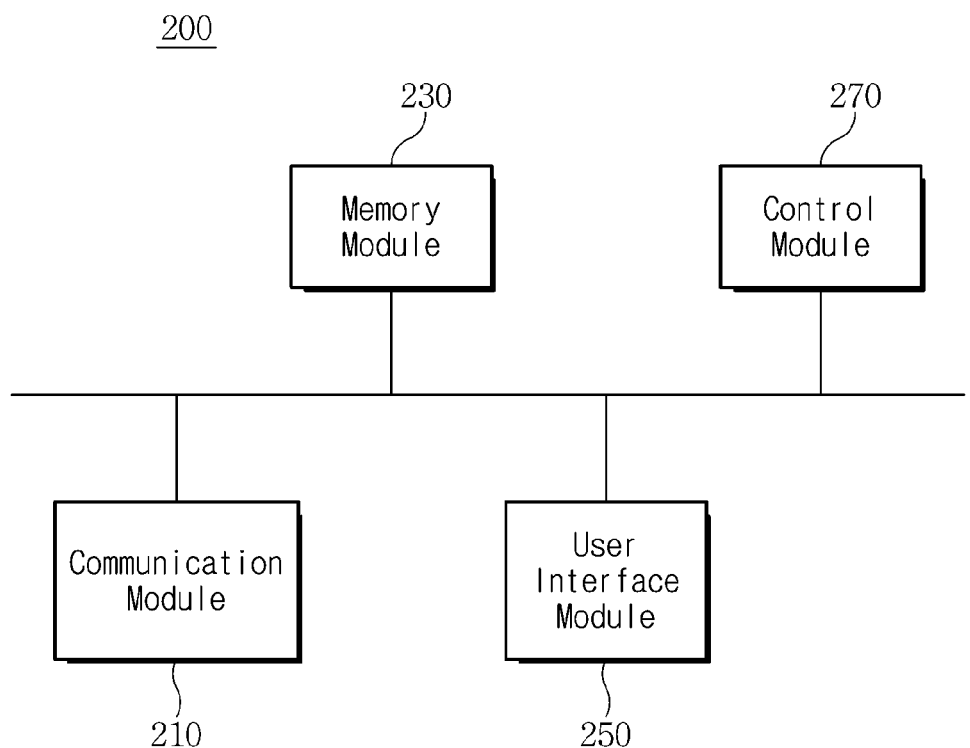
FIG. 2 is a block diagram illustrating a beacon service server according to an embodiment of the present invention.
Figure 3:
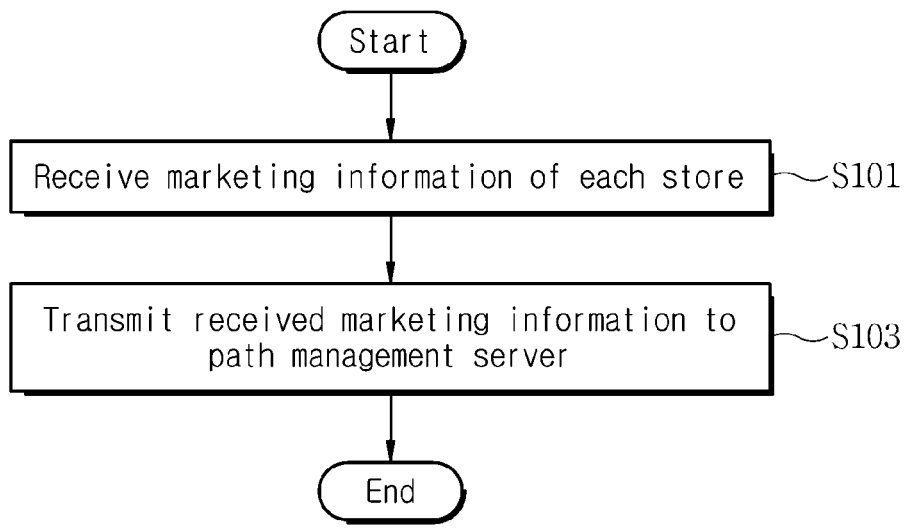
FIG. 3 is a flow diagram illustrating an operation process of a beacon service server according to an embodiment of the present invention.

FIG. 2 is a block diagram illustrating a beacon service server, and FIG. 3 is a flow diagram illustrating an operation process of a beacon service server.

Referring to FIG. 2, the beacon service server 200 may include a communication module 210, a memory module 230, a user interface module 250, and a control module 270.

The communication module 210 is a device for communicating with the path management server 400. The communication module 210 may use wireless communication technique such as, but not limited to, WLAN (Wireless Local Access Network), Wi-Fi, Wibro, Wimax, HSDPA (High Speed Downlink Packet Access), or the like. Alternatively or additionally, depending on system types, the communication module 210 may use wired communication technique such as Ethernet, xDSL (ADSL, VDSL), HFC (Hybrid Fiber Coaxial cable), FTTC (Fiber To The Curb), FTTH (Fiber To The Home), or the like.

Particularly, the beacon service server 200 may send marketing information of each store to the path management server 400 through the communication module 210.

The memory module 230 is a device for storing data and includes a main memory unit and an auxiliary memory unit. Further, the memory module 230 stores a program required for the operation of the beacon service server 200. The memory module 230 may include mainly a program region and a data region. When any function is activated in response to a user's request, the beacon service server 200 executes a relevant application and offers a particular function under the control of the control module 270.

Particularly, the memory module 230 may store marketing information of each store collected through the user interface module 250.

The user interface module 250 is a device for receiving a user's request or outputting information in response to such a user's request.

Through a wired/wireless communication network, the user interface module 250 may be connected with any device or mechanism for receiving an input from a user.

Particularly, the beacon service server 200 may receive, as an input, marketing information about each store from a manager of each store, a shopping mall, a department store, etc. through the user interface module 250.

The control module 270 may be a processor for triggering and operating each element and an operating system (OS) of the beacon service server 200.

Referring to FIG. 3, an operation process of the beacon service server 200 is generally controlled by the control module 270. The beacon service server 200 may receive marketing information of each store through the user interface module 250 (step S101) and then transmit the received marketing information to the path management server 400 (step S103).

Described heretofore are elements and an operation process of the beacon service server 200 according to an embodiment of this invention.

Now, the terminal device 300 according to an embodiment of this invention will be described in detail.

Figure 4:
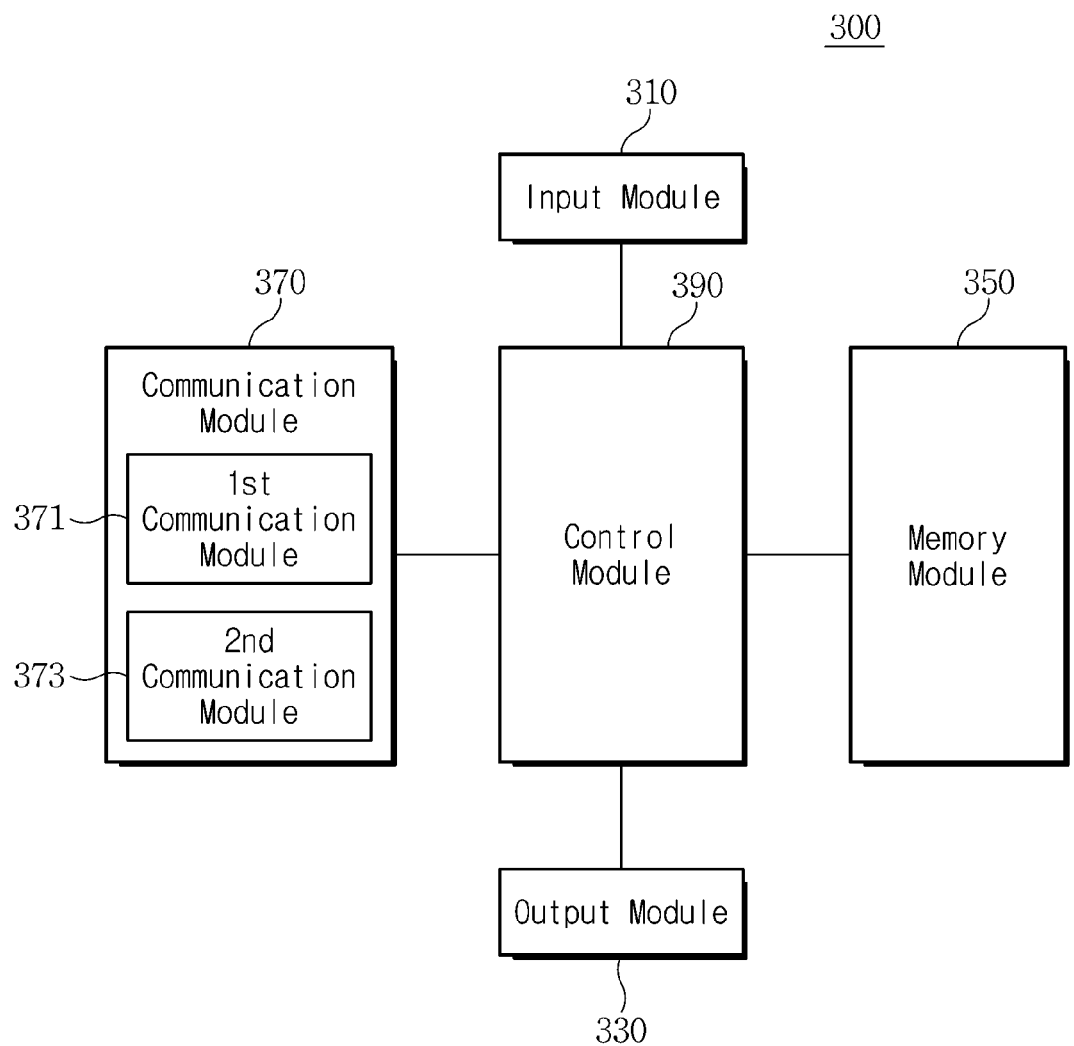
FIG. 4 is a block diagram illustrating a terminal device according to an embodiment of the present invention.
Figure 5:
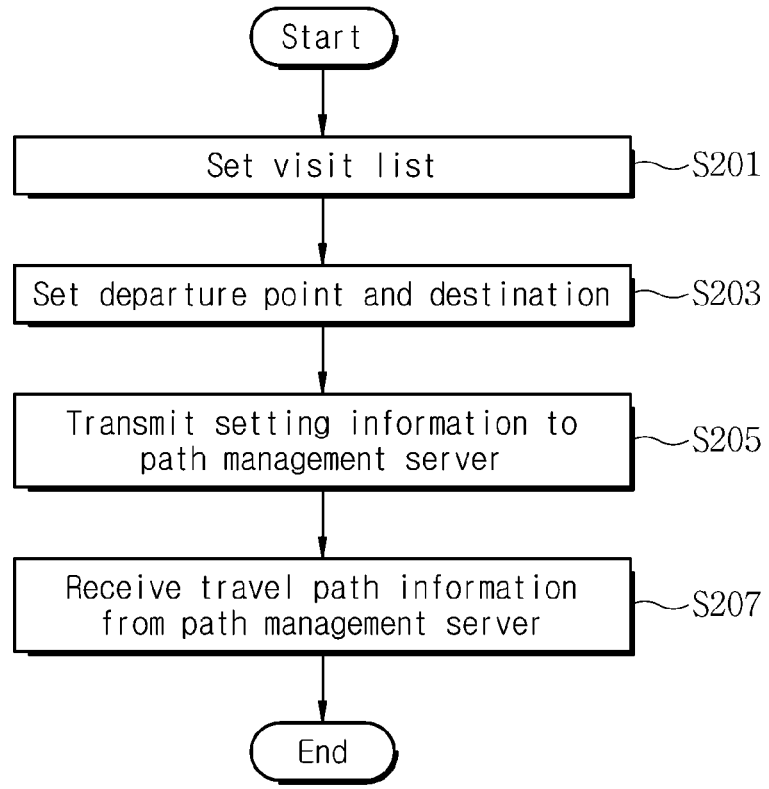
FIGS. 5 and 6 are flow diagrams illustrating an operation process of a terminal device according to embodiments of the present invention.
Figure 6:
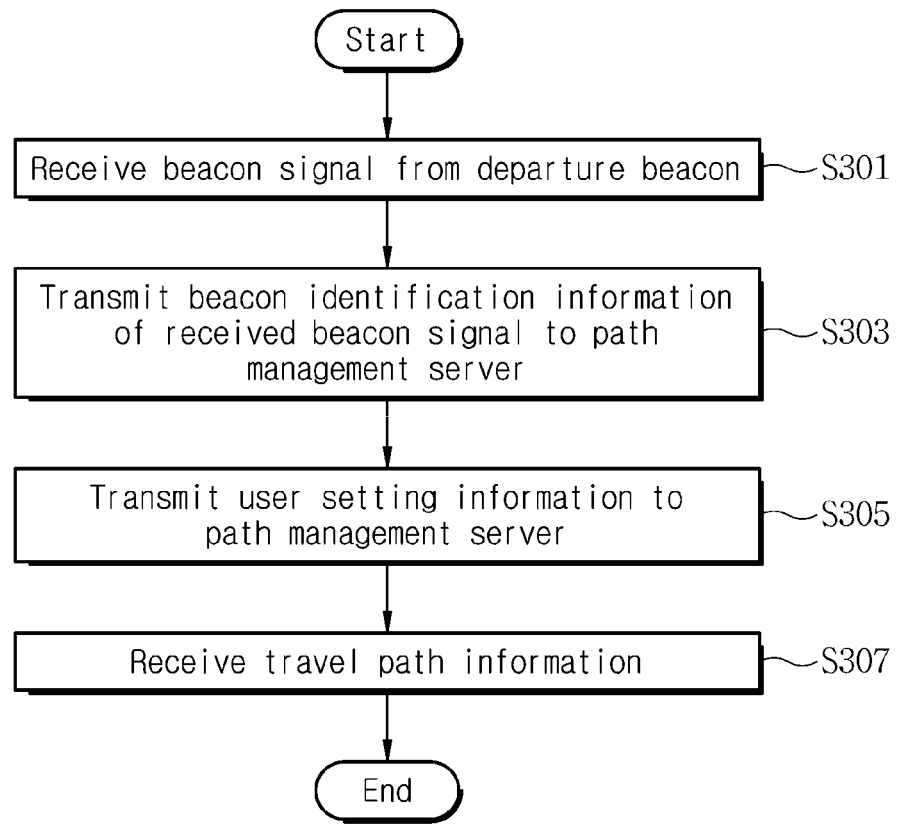

FIG. 4 is a block diagram illustrating a terminal device according to an embodiment of the present invention, and FIGS. 5 and 6 are flow diagrams illustrating an operation process of a terminal device according to an embodiment of the present invention.

Referring to FIG. 4, the terminal device 300 may include an input module 310, an output module 330, a memory module 350, a communication module 370, and a control module 390.

The input module 310 is configured to receive user's manipulation for entering various kinds of information and setting or controlling various functions of the terminal device 300, to create a corresponding input signal, and to deliver the input signal to the control module 390. The input module 310 may include a keypad and/or a touch pad. The input module 310 formed of a touch panel may be integrated with the output module 330 formed of a display panel to constitute a touch screen. The input module 310 may use various input mechanisms such as a keyboard, a mouse, a joystick, a jog wheel, a touch-sensitive unit, a gesture or image detection unit, a voice recognition unit, and the like. Additionally, the input module 310 detects input information entered by the user and delivers it to the control module 390.

Particularly, the terminal device 300 may receive a user's input for setting destination information, a visit list, and the like through the input module 310.

The output module 330 is configured to display information about the state and result of operations generated during the execution of functions of the terminal device 300. Also, the output module 330 may display a menu of the terminal device 300 and user data entered by the user. The output module 330 may be formed of LCD (Liquid Crystal Display), TFT-LCD (Thin Film Transistor LCD), LED (Light Emitting Diode), OLED (Organic LED), AMOLED (Active Matrix OLED), retina display, flexible display, 3-dimensional display, or the like. In case the output module 330 is formed of a touch screen, the output module 330 may perform the whole or parts of functions of the input module 310.

Particularly, the terminal device 300 may offer a travel path, received from the path management server 400, to a user through the output module 330.

The memory module 350 is a device for storing data and includes a main memory unit and an auxiliary memory unit. Further, the memory module 350 stores a program required for the operation of the terminal device 300. The memory module 350 may include mainly a program region and a data region. When any function is activated in response to a user's request, the terminal device 300 executes a relevant application and offers a particular function under the control of the control module 390.

The communication module 370 is configured to transmit or receive data to or from the path management server 400 through the communication network 100.

The communication module 370 may include an RF transmitter which up-converts the frequency of an outgoing signal and then amplifies the signal, an RF receiver which amplifies with low-noise an incoming signal and down-converts the frequency of the signal, a data processor for processing a communication protocol based on a specific communication scheme, and the like. The communication module 370 may include at least one wireless communication module (not shown) and/or at least one wired communication module (not shown). The wireless communication module may be configured for transmission and reception based on a particular wireless communication scheme. In case of using wireless communication, the terminal device 300 may transmit or receive data to or from the beacon service server 400 by using one of a wireless network communication module, a WLAN communication module, and a WPAN communication module.

The communication module 370 includes the first communication module 371 and the second communication module 373.

The first communication module 371 receives a signal transmitted from the beacon device 200. The first communication module 371 may perform PAN-type communication including Bluetooth.

The second communication module 373 communicates with the path management server 400 through the communication network 100. The second communication module 373 may use wireless communication technique such as, but not limited to, WLAN (Wireless Local Access Network), Wi-Fi, Wibro, Wimax, HSDPA (High Speed Downlink Packet Access), or the like.

The control module 390 may be a processor for triggering and operating each element of the terminal device 300 and an operation system.

For example, the control module 390 may control the communication module 370 to transmit a signal entered through the input module 310 to the path management server 400, control the output module 330 to output a beacon signal received through the communication module 370 or information received from the path management server 400, and control the memory module 350 to store such information and/or data.

Particularly, the control module 390 controls the overall operation process of the terminal device 300 according to one embodiment and another embodiment of the present invention.

FIG. 5 is a flow diagram illustrating an operation process of a terminal device according to one embodiment of the present invention.

Referring to FIG. 5, the terminal device 300, controlled by the control module 390, may perform setting of a visit list, a departure point, and/or a destination in response to a user's request (steps S201 and S203), and then transmit this setting information to the path management server 400 (step S205).

Thereafter, the terminal device 300 may receive information about a selected travel path from the path management server 400 (step S207), and then offer the received travel path information to a user.

FIG. 6 is a flow diagram illustrating an operation process of a terminal device according to another embodiment of the present invention.

Referring to FIG. 6, the terminal device 300, controlled by the control module 390, may receive a beacon signal from the beacon device 500 selected as a departure beacon (step S301), and then transmit beacon identification information of the received beacon signal to the path management server 400 (step S303).

Additionally, the terminal device 300 may further transmit user setting information, e.g., a visit list, to the path management server 400 (step S305).

Thereafter, the terminal device 300 may receive information about a travel path selected by the path management server 400 and then offer the received information to a user (step S307).

The above-discussed operation of the terminal device 300 may be controlled and implemented by the control module 390.

Described heretofore is the terminal device 300 according to embodiments of this invention.

Now, the path management server 400 according to an embodiment of this invention will be described in detail.

Figure 7:
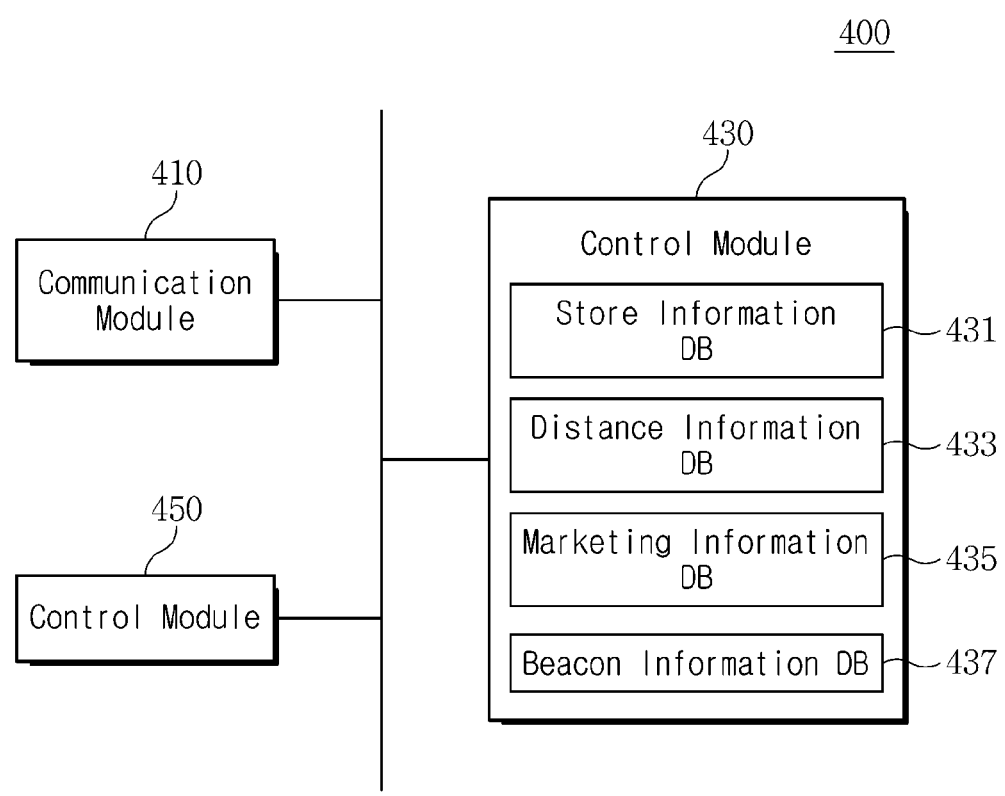
FIG. 7 is a block diagram illustrating a path management server according to an embodiment of the present invention.
Figure 8:
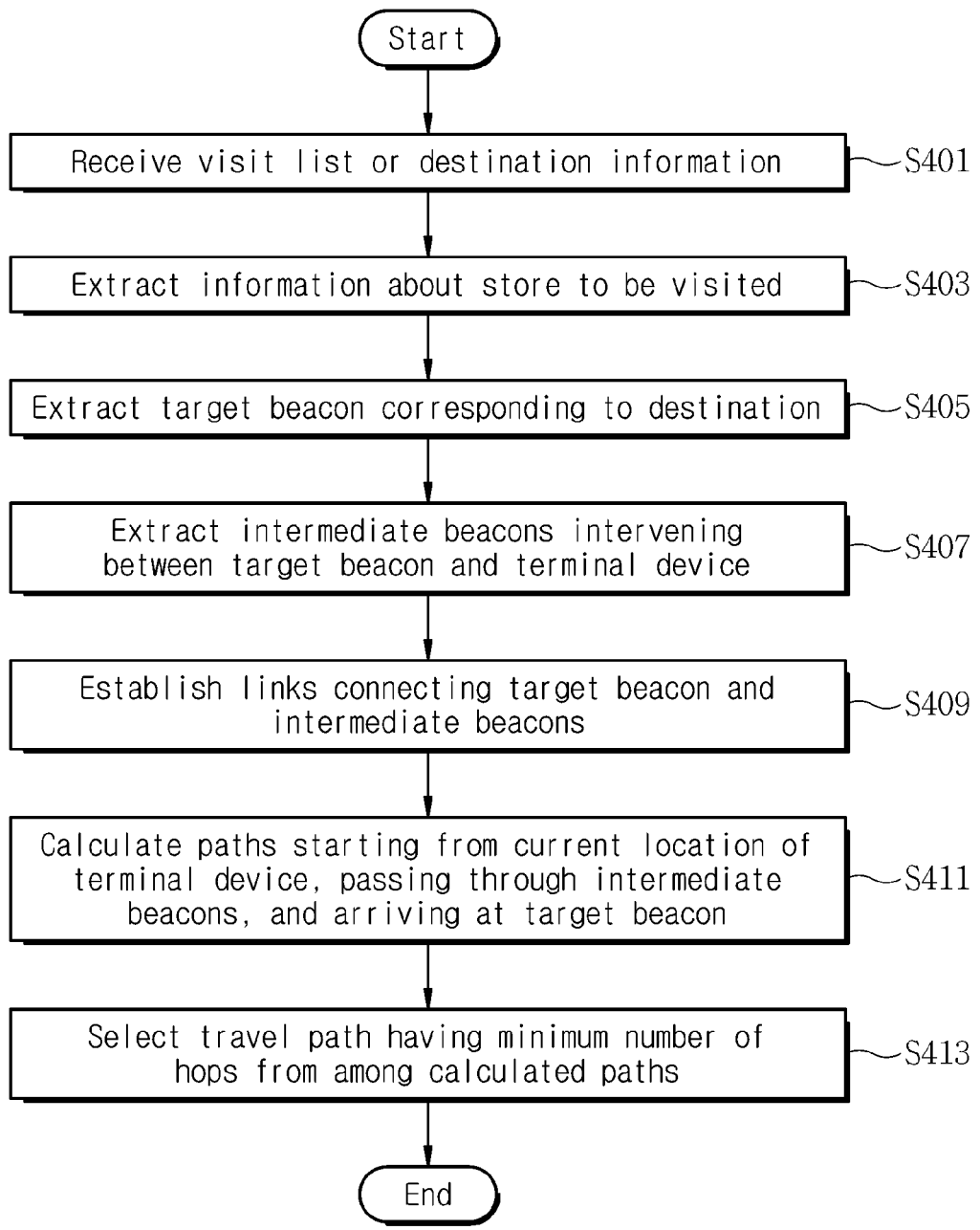
FIGS. 8 and 9 are flow diagrams illustrating an operation process of a path management server according to embodiments of the present invention.
Figure 9:
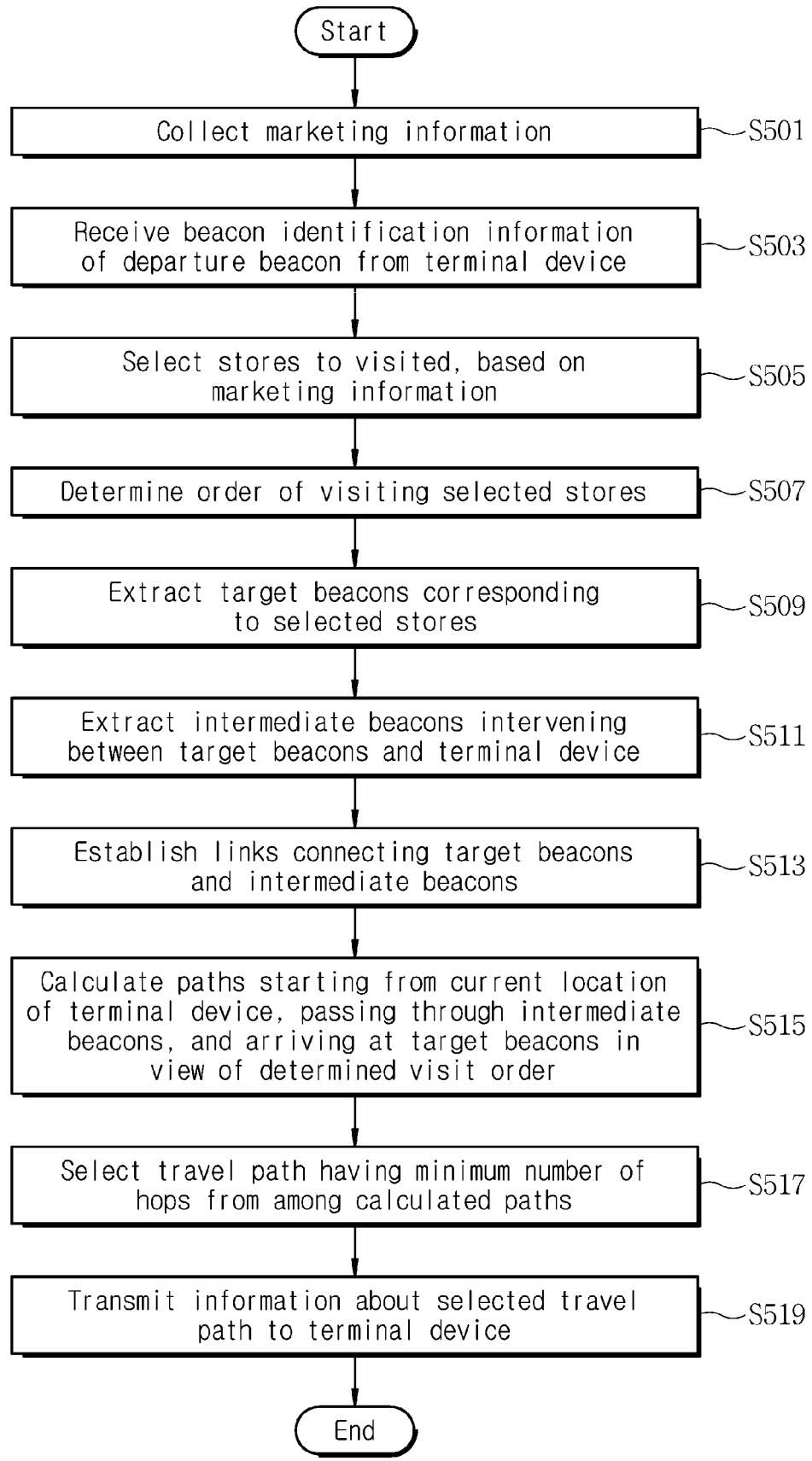

FIG. 7 is a block diagram illustrating a path management server according to an embodiment of the present invention, and FIGS. 8 and 9 are flow diagrams illustrating an operation process of a path management server according to embodiments of the present invention.

Referring to FIG. 7, the path management server 400 may include a communication module 410, a memory module 430, and a control module 450.

The communication module 410 is configured to communicate with the terminal device 300. The network for the communication module 410 may use wireless communication technique such as, but not limited to, WLAN (Wireless Local Access Network), Wi-Fi, Wibro, Wimax, HSDPA (High Speed Downlink Packet Access), or the like. Alternatively or additionally, depending on system types, the network may use wired communication technique such as Ethernet, xDSL (ADSL, VDSL), HFC (Hybrid Fiber Coaxial cable), FTTC (Fiber To The Curb), FTTH (Fiber To The Home), or the like.

Particularly, under the control of the control module 450, the communication module 410 may receive, from the terminal device 300, beacon identification information, setting information about a departure point and/or a destination, a visit list, etc. included in a beacon signal received by the terminal device 300. Also, the communication module 410 may transmit information about a selected travel path to the terminal device 300.

The memory module 430 is a device for storing data and includes a main memory unit and an auxiliary memory unit. Further, the memory module 430 stores a program required for the operation of the path management server 400. The memory module 430 may include mainly a program region and a data region. When any function is activated in response to a user's request, the path management server 400 executes a relevant application and offers a particular function under the control of the control module 450.

Particularly, the memory module 430 may have a store information database (DB) 431 that records a mapping relation between a store and a beacon device.

The store information DB 431 may also record various kinds of information about at least one store mapped to at least one beacon device. This information may include a brand name, a store name, a sales article sold by a store, opening hours, event information such as a sales event, inventory information of a sale article, location information of a store, and the like.

By using such information stored in the store information DB 431, the path management server 400 may extract at least one store a user will visit. Then the path management server 400 may extract a target beacon corresponding to the extracted store and an intermediate beacon intervening between the target beacon and the terminal device 300.

Additionally, the memory module 430 may have a distance information database 433 that records a physical distance between the beacon devices 300.

Such distance information may be used for selecting a travel path by applying a weight value to the calculated travel path.

Further, the memory module 430 may have a marketing information database 435 for recording marketing information collected by the path management server 400. Also, the memory module 430 may have a beacon information database 437 for recording information about the beacon device 500 corresponding to each store.

Specifically, the beacon information DB 437 may record mapping relations among location information and/or identification information of the beacon devices 500 and various kinds of information about stores corresponding to the beacon devices 500. As mentioned above, such information about stores may include a brand name, a store name, a sales article sold by a store, opening hours, event information such as a sales event, inventory information of a sale article, location information of a store, and the like.

By using such information stored in the beacon information DB 437, the path management server 400 may extract at least one store a user will visit. Then the path management server 400 may extract a target beacon corresponding to the extracted store and an intermediate beacon intervening between the target beacon and the terminal device 300.

The control module 450 may be a processor for triggering and operating each element of the path management server 400 and an operation system. Also, the control module 450 controls the whole operations of the path management server 400.

According to an embodiment, the path management server 400, generally controlled by the control module 450, may operate as shown in FIG. 8. Now referring to FIG. 8, the path management server 400 may set at least one destination. For example, the path management server 400 may receive destination information from the terminal device 300 and then determine a destination. Additionally or alternatively, the path management server 400 may receive a visit list containing information about one or more stores, then extract at least one store to be visited by a user from the visit list, and then determine the extracted at least one store as at least one destination (steps S401 and S403).

Also, the path management server 400 may extract, as a target beacon, at least one beacon device corresponding to the at least one destination (step S405), and then extract, as an intermediate beacon, one or more beacon devices intervening between the target beacon and a current location of the terminal device 300 (step S407).

Herein, the target beacon may refer to the beacon device 200 corresponding to a specific store to be visited by a user on the basis of a visit list or destination selected by the user, and the intermediate beacon may refer to the beacon device 200 located on a path to be passed by the user to reach the specific store corresponding to the target beacon.

The current location of the terminal device 300 may be estimated from the location of a departure beacon, which means the beacon device 200 corresponding to a departure point of the user.

The departure beacon may be selected by the path management server 400. Namely, the path management server 400 may collect, from the terminal device 300, beacon identification information contained in beacon signals received by the terminal device 300 and, based on the collected beacon identification information, select the departure beacon from among such beacon devices.

In this case, the beacon device 200 selected as the departure beacon may correspond to beacon identification information having the greatest received signal strength in the beacon devices from which the terminal device 300 receives beacon signals. Namely, greater received signal strength may mean a shorter distance between the terminal device 300 and the beacon device 200.

If two or more target beacons are extracted at step S405, the order of the extracted target beacons may be defined. Namely, in this case, the order of visiting stores may be defined, and thereby the order of the target beacons corresponding to such stores may be defined.

After the target beacon and the intermediate beacon are extracted at steps S405 and S407, the path management server 400 may establish a link that connects the target beacon and the intermediate beacon (step S409).

At this step, geographical information associated with the target beacon and the intermediate beacon may be further considered to establish the link. Namely, the link may be formed in view of an actually usable path with reference to an indoor map of a particular space in which target beacons and intermediate beacons are installed. For example, if there is an obstacle such as a wall between the target beacon A and the intermediate beacon B, no path is available therebetween. Thus, the link may not be formed between the target beacon A and the intermediate beacon B.

Then, based on the established link, the path management server 400 may calculate one or more paths configured to start from a current location of the terminal device 300, to pass through the intermediate beacon, and to arrive at the target beacon (step S411). Thereafter, the path management server 400 may select an optimal travel path having the minimum number of link hops from among the calculated paths and then transmit information about the selected travel path to the terminal device 300 (step S413).

When selecting the optimal travel path from the calculated paths, the path management server 400 may further consider a weight value. Actually, even though the hop number is small, a physical distance may be long. Namely, the selected travel path depending on the hop number only may not be the shortest path. Therefore, in order to select the actually shortest path, the path management server 400 may assign a weight value to each link in view of a physical distance. For example, the longer the physical distance is, the higher weight value may be assigned. Then, with regard to each path, the path management server 400 may sum up all weight values assigned to links in the path rather than by merely counting the hop number of the path. As a result, the path management server 400 may select, as the travel path, a certain path having the lowest sum of weight values. This result is then transmitted to the terminal device 300.

According to another embodiment, the path management server 400 may operate as shown in FIG. 9. Now referring to FIG. 9, the path management server 400 may collect marketing information about one or more stores (step S501).

At this step, the path management server 400 may receive the marketing information from the beacon service server 200 or directly collect the marketing information from a manager of a shopping mall, a department store, etc. or from each store.

Then the path management server 400 may receive beacon identification information of a departure beacon from the terminal device 300 (step S503). This beacon identification information corresponds to a beacon signal emitted from the beacon device 500 selected as the departure beacon. Thereafter, based on the collected marketing information, the path management server 400 may select one or more stores to be visited (step S505), and determine the order of visiting the selected stores (step S507).

The departure beacon means the beacon device 500 acting as a starting point of the travel path, and the beacon device 500 installed at an entrance of a shopping mall or a department store may be determined as the departure beacon. If the terminal device 300 approaching the entrance receives a beacon signal from the departure beacon, the terminal device 300 may transmit beacon identification information corresponding to the received beacon signal to the path management server 400. Then the path management server 400 may extract one or more stores a user will visit.

Instead of determining in advance the departure beacon, the path management server 400 may collect beacon identification information corresponding to beacon signals received by the terminal device 300 being moved, and then select, based on the collected beacon identification information, the departure beacon from among the beacon devices 500 emitting such beacon signals. Namely, in view of the receive signal strength of a beacon signal received by the terminal device 300, the path management server 400 may selecting, as the departure beacon, a beacon device that emits a beacon signal corresponding to the greatest received signal.

Also, since the departure beacon may be located near the terminal device 300, the location of the departure beacon may be used for estimating the current location of the terminal device 300.

Additionally, the path management server 400 may receive a visit list containing information about one or more stores from the terminal device 300, then extract one or more stores to be visited by a user from the visit list, and then define the order of visiting such stores.

Also, the path management server 400 may extract, as a target beacon, one or more beacon devices 500 corresponding to the extracted one or more stores (step S509), and then extract, as an intermediate beacon, one or more beacon devices 500 intervening between the target beacon and a current location of the terminal device 300 (step S511).

Herein, the target beacon may refer to the beacon device 500 corresponding to a specific store to be visited by a user on the basis of collected marketing information, and the intermediate beacon may refer to the beacon device 500 located on a path to be passed by the user to reach the specific store corresponding to the target beacon.

The current location of the terminal device 300 may be estimated from the location of a departure beacon, which means the beacon device 200 corresponding to a departure point of the user. Also, the departure beacon may be selected by the path management server 400. Namely, the path management server 400 may collect, from the terminal device 300, beacon identification information contained in beacon signals received by the terminal device 300 and, based on the collected beacon identification information, select the departure beacon from among such beacon devices.

In this case, the beacon device 500 selected as the departure beacon may correspond to beacon identification information having the greatest received signal strength in the beacon devices from which the terminal device 300 receives beacon signals. Namely, greater received signal strength may mean a shorter distance between the terminal device 300 and the beacon device 200.

After the target beacon and the intermediate beacon are extracted at steps S509 and S511, the path management server 400 may establish a link that connects the target beacon and the intermediate beacon (step S513).

At this step, geographical information associated with the target beacon and the intermediate beacon may be further considered to establish the link. Namely, the link may be formed in view of an actually usable path with reference to an indoor map of a particular space in which target beacons and intermediate beacons are installed. For example, if there is an obstacle such as a wall between the target beacon A and the intermediate beacon B, no path is available therebetween. Thus, the link may not be formed between the target beacon A and the intermediate beacon B.

Then, based on the established link, the path management server 400 may calculate one or more paths configured to start from a current location of the terminal device 300, to pass through the intermediate beacon, and to arrive at the target beacon (step S515). Thereafter, the path management server 400 may select an optimal travel path having the minimum number of link hops from among the calculated paths (step S517) and then transmit information about the selected travel path to the terminal device 300 (step S519).

When selecting the optimal travel path from the calculated paths, the path management server 400 may further consider a weight value. Actually, even though the hop number is small, a physical distance may be long. Namely, the selected travel path depending on the hop number only may not be the shortest path. Therefore, in order to select the actually shortest path, the path management server 400 may assign a weight value to each link in view of a physical distance. For example, the longer the physical distance is, the higher weight value may be assigned. Then, with regard to each path, the path management server 400 may sum up all weight values assigned to links in the path rather than by merely counting the hop number of the path. As a result, the path management server 400 may select, as the travel path, a certain path having the lowest sum of weight values. This result is then transmitted to the terminal device 300.

As described above, the overall operation process of the path management server 400 may be controlled and implemented by the control module 450 of the path management server 400.

Described heretofore is the path management server 400 according to embodiments of this invention.

Now, a method for providing a travel path according to various embodiments of this invention will be described in detail.

FIGS. 10 to 13 are exemplary diagrams illustrating a method for providing a travel path according to various embodiments of the present invention.

Figure 10:
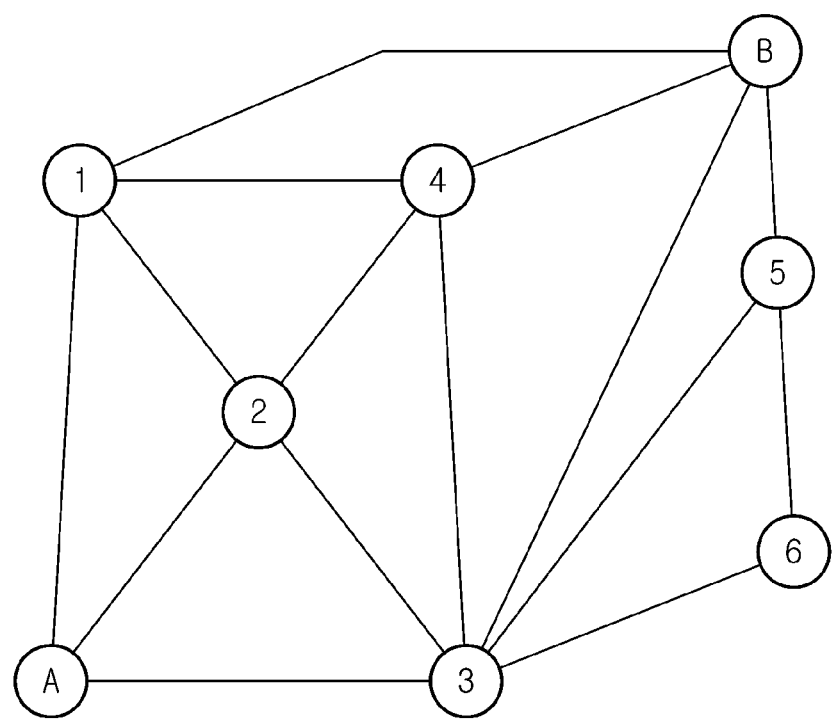
FIGS. 10 to 13 are exemplary diagrams illustrating a method for providing a travel path according to various embodiments of the present invention.

Referring to FIG. 10 that shows one example, in case information about a destination B is received from the terminal device 300, a beacon device B corresponding to the destination B is extracted as a target beacon, and a beacon device A corresponding to the current location of the terminal device 300 is set as a departure beacon.

Also, beacon devices 1~6 located between the beacon devices A and B, i.e., between the target beacon (B) and the current location (A) of the terminal device 300, are extracted as intermediate beacons.

Additionally, the beacon devices A, B and 1~6 are connected to each other by links. This link may be established by considering geographic information where such beacon devices A, B and 1~6 are located.

Namely, in FIG. 10, beacons 3 and 4 are directly connected through a link, but beacons 4 and 6 are not directly connected through a link. This means that since there is no direct path such as a road or a pedestrian passage between beacons 4 and 6, a user cannot move on foot from beacon 4 to beacon 6 directly without passing through any other beacon. Therefore, no link is established between beacons 4 and 6.

Based on the established links as shown in FIG. 10, the path management server 400 may calculate one or more paths and then select a travel path having the minimum hop number from among the calculated paths.

In an example of FIG. 10, two paths 'A-1-B' and 'A-3-B' have the minimum hop number from the beacon A to the beacon B. Therefore, the path management server 400 may transmit one or both of these paths having the minimum hop number to the terminal device 300.

In this case, the path management server 400 may select one path from two paths in view of a weight value assigned depending on a physical distance. For example, let's suppose that a weight value between 'A-1' is '2', a weight value between '1-B' is '3', a weight value between 'A-3' is '2', and a weight value between '3-B' is '5'.

Then, the sum of weight values in a path 'A-1-B' is '5', and the sum of weight values in a path 'A-3-B' is '7'. Therefore, a path 'A-1-B' having a smaller sum of weight values is selected as a travel path and offered to the terminal device 300.

In another example, a path 'A-1-4-B' may have a smaller sum of weight values than a path 'A-1-B' even though having a greater hop number. Therefore, in this case, the path management server 400 may select a path 'A-1-4-B' as a travel path and offer it to the terminal device 300.

Figure 11:
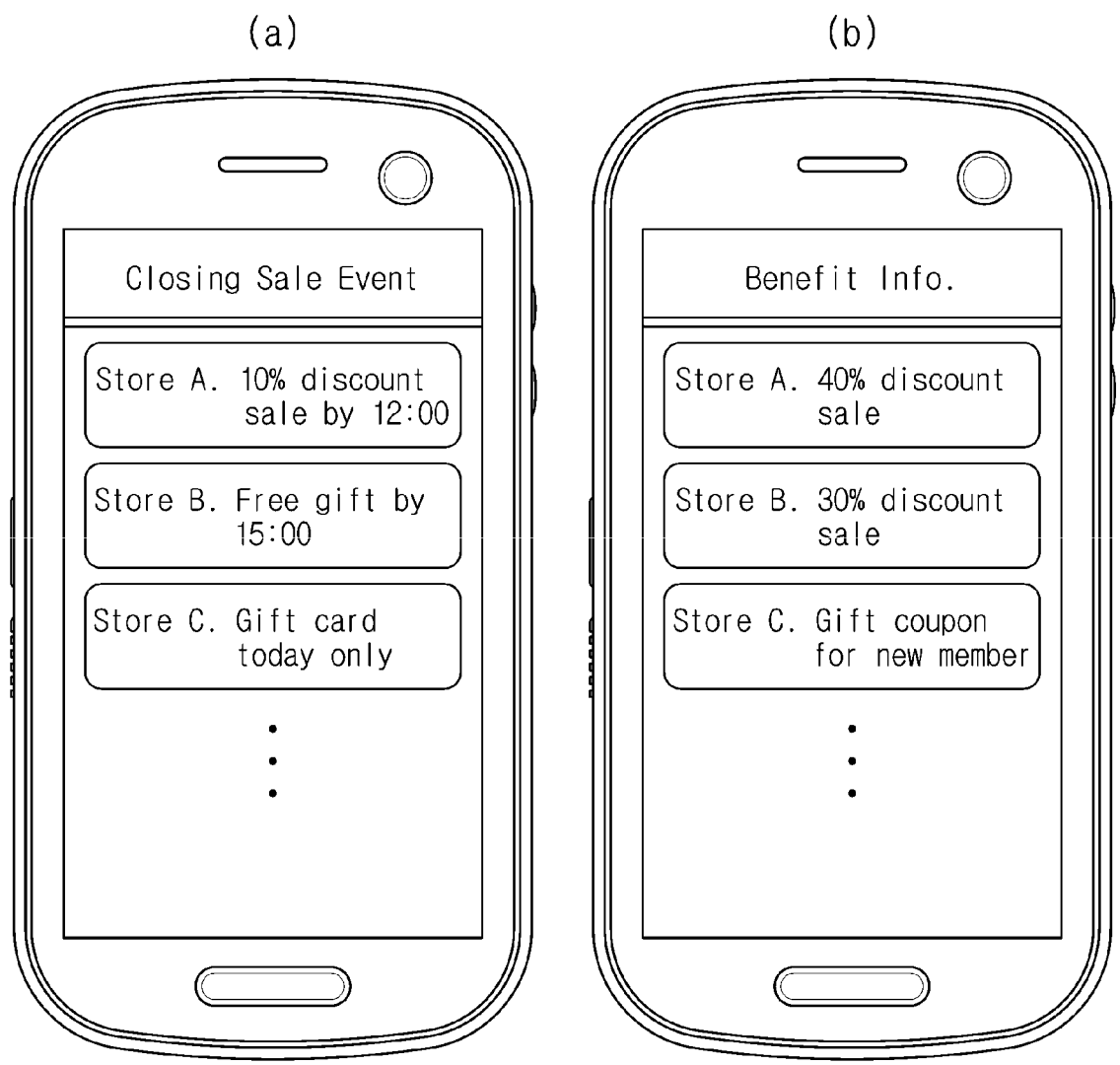

According to another embodiment, FIG. 11 illustrates information, displayed on the terminal device 300, about some stores extracted from marketing information by the path management server 400 and about a visit order of such stores.

Referring to FIG. 11, the path management server 400 extracts one or more stores such as 'Store A', 'Store B', 'Store C', etc., based on the collected marketing information.

Specifically, the section (a) of FIG. 11 shows an example of a visit order determined in view of an event ending time. Namely, 'Store A' closing an event at 12 o'clock is determined as the first visit store, 'Store B' closing an event at 15 o'clock is determined as the second visit store, and 'Store C' closing an event today is determined as the third visit store.

Additionally, the section (b) of FIG. 11 shows another example of a visit order determined in view of an event benefit. Namely, 'Store A' offering 40% discount is determined as the first visit store, 'Store B' offering 30% discount is determined as the second visit store, and 'Store C' offering a discount coupon to a new member is determined as the third visit store.

If some stores are extracted and the visit order thereof is determined as shown in FIG. 11, the path management server 400 may extract a target beacon and an intermediate beacon, establish a link therebetween, calculate candidate paths on the basis of the link, select an optimal travel path from among the candidate paths in view of the number of link hops, and then send information about the selected travel path to the terminal device 300.

Hereinafter, two examples of selecting the optimal travel path will be described with reference to FIG. 12.

Let's suppose that the terminal device 300 receives a visit list and sets a beacon device A as a departure beacon. Additionally, let's suppose that beacon devices B, C and D are extracted as target beacons and also beacon devices 1, 2, 3 and 4 are extracted as intermediate beacons.

A travel path that selects, as a destination, one of the target beacons B, C and D, includes all of the target beacons B, C and D, and has the minimum link hops is obtained as follows: 'A-2-D-B-C', 'A-1-D-B-C', 'A-3-D-B-C', and 'A-3-C-B-D'.

The path management server 400 may send all or some of these travel paths to the terminal device 300.

Additionally, the path management server 400 may assign a weight value to each link in view of a physical distance between adjacent beacon devices. In this case, the path management server 400 may select, as the travel path, a certain path having the lowest sum of weight values and then transmit it to the terminal device 300.

For example, a path 'A-1-B-C-3-D' may have a smaller sum of weight values than the above four paths even though having a greater hop number. In this case, the path management server 400 may select this path 'A-1-B-C-3-D' as a travel path and offer it to the terminal device 300.

Figure 12:
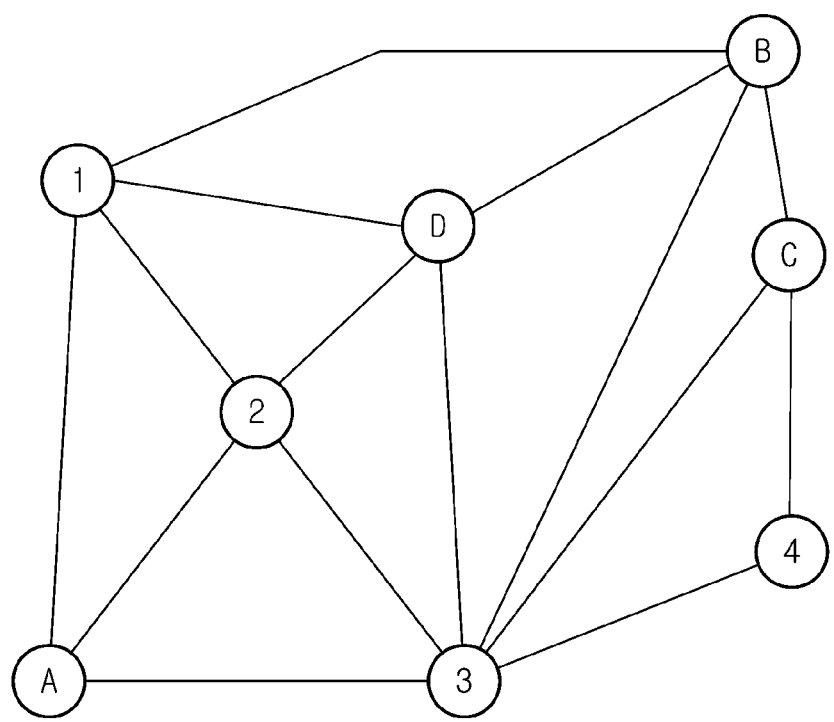

Meanwhile, in FIG. 12, the beacon devices D and 4 are not directly connected through a link in consideration for geographical information thereof.

Alternatively, the optimal travel path may be selected in view of marketing information. Let's suppose that, based on marketing information, beacon devices A, B, C and D are extracted as target beacons and also beacon devices 1, 2, 3 and 4 are extracted as intermediate beacons.

If the order of visit is defined as 'A-D-B-C', a travel path having the minimum link hops and complying with the visit order is as follows: 'A-2-D-B-C', 'A-1-D-B-C', and 'A-3-D-B-C'.

The path management server 400 may send all or some of these travel paths to the terminal device 300.

Additionally, the path management server 400 may assign a weight value to each link in view of a physical distance between adjacent beacon devices. In this case, the path management server 400 may select, as the travel path, a certain path having the lowest sum of weight values and then transmit it to the terminal device 300.

For example, a path 'A-2-3-D-B-C' may have a smaller sum of weight values than the above three paths even though having a greater hop number. In this case, the path management server 400 may select this path 'A-2-3-D-B-C' as a travel path and offer it to the terminal device 300.

Meanwhile, links between pairs of beacon devices may be formed in view of geographical information. Namely, in FIG. 12, beacons 4 and D are not directly connected through a link. This means that since there is no direct path such as a road or a pedestrian passage between beacons 4 and D, a user cannot move on foot from beacon 4 to beacon D directly without passing through any other beacon. Therefore, no link is established between beacons 4 and D.

Figure 13:
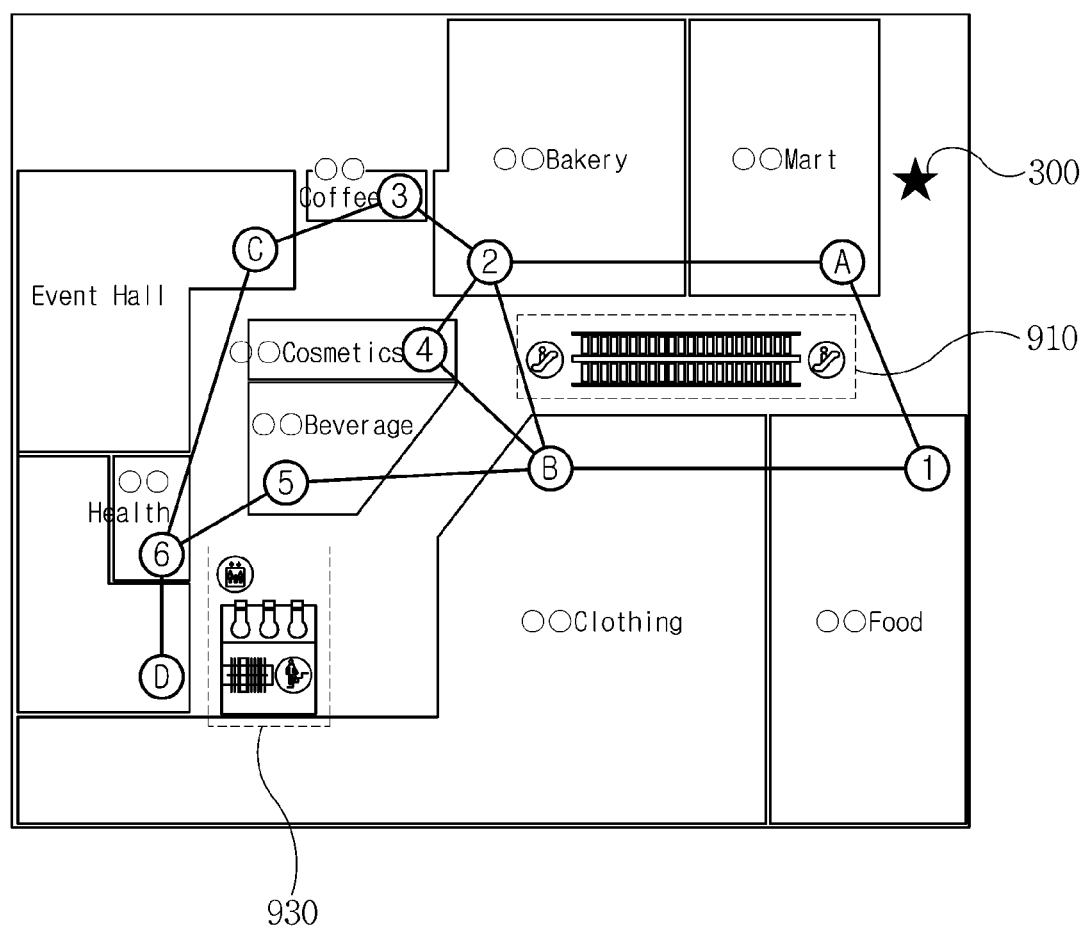

FIG. 13 shows a realistic example of links formed by further considering geographical information in case of receiving destination information and a visit list from the terminal device 300.

In FIG. 13, a star-shaped mark denotes the current location of the terminal device 300.

The nearest beacon device from the terminal device 300 is a beacon device A. Namely, the received signal strength of a beacon signal received from the beacon device A is greater than others. Therefore, the beacon device A is selected as a departure beacon.

Based on the visit list, four beacon devices A, B, C and D are extracted as target beacons, and six beacon devices 1, 2, 3, 4, 5 and 6 are extracted as intermediate beacons.

Let's suppose that a user wants to ride an elevator 930 after shopping and thus the beacon device D near the elevator 930 is selected as a destination.

Then a path having the minimum link hops selected from among all paths which start from the beacon device A, pass through the beacon devices B and C, and arrive at the beacon device D is as follows: 'A-1-B-4-C-6-D' and 'A-2-B-4-C-6-D'.

If the sum of weight values in a path 'A-1-B-4-C-6-D' is 12, and if the sum of weight values in a path 'A-2-B-4-C-6-D' is 10, the latter path is selected as an optimal travel path.

Meanwhile, the beacon devices A and B are not directly connected through a link. This means that since there is no direct path between the beacon devices A and B because of a certain obstacle such as an escalator 910.

Hereinbefore, various methods for providing an indoor travel path are fully described according various embodiments of this invention.

These methods may be favorably implemented in an operating environment to be discussed hereinafter.

Figure 14:
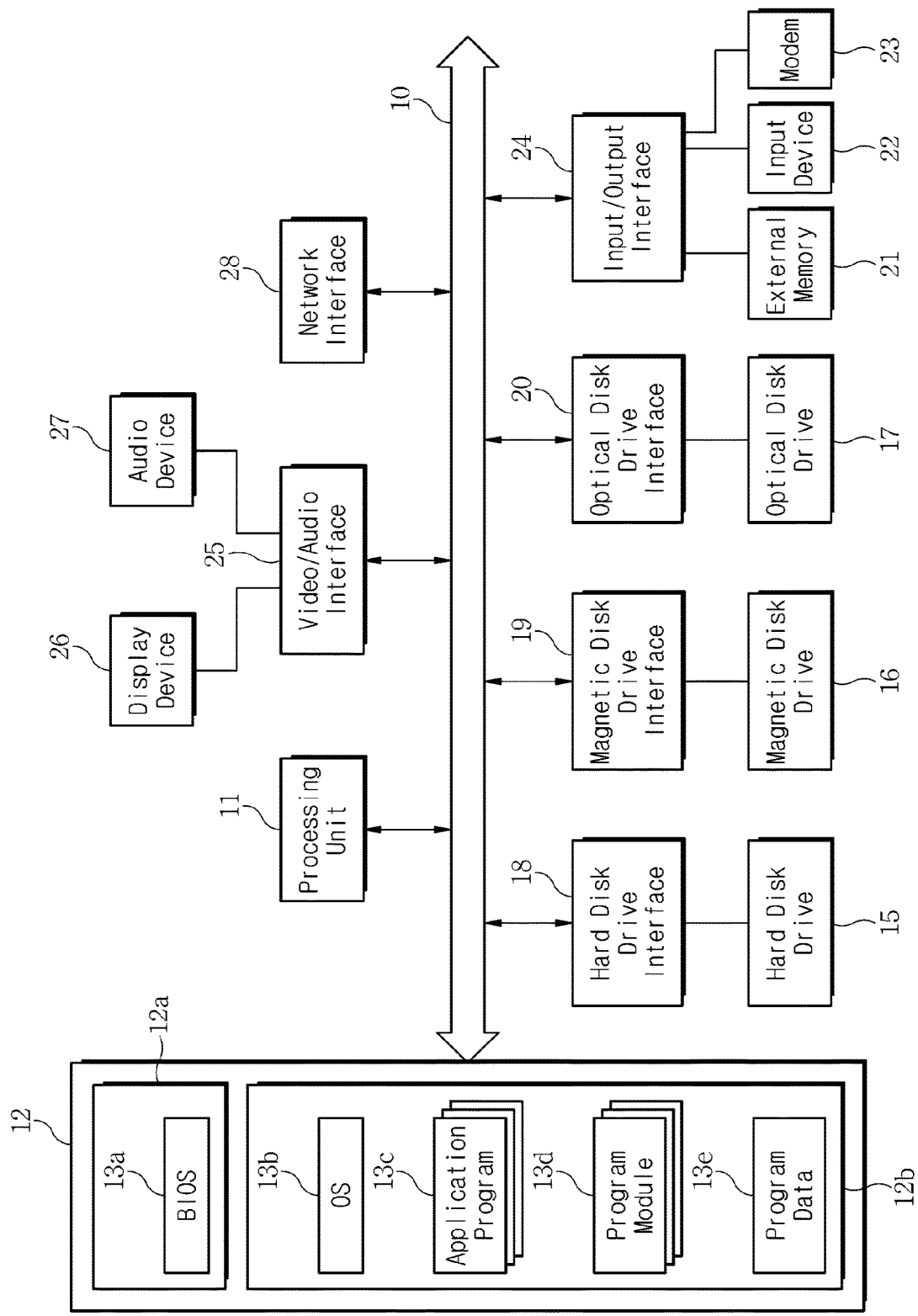
FIG. 14 is a block diagram illustrating an operating environment of system for providing a travel path according to an embodiment of the present invention.

FIG. 14 is a block diagram illustrating an operating environment of system for providing a travel path according to an embodiment of the present invention.

FIG. 14 and the following discussion are intended to provide a brief, general description of an example suitable computing environment in which the invention may be implemented. Although not required (e.g., when implemented in hardware), the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

Referring to FIG. 14, an exemplary computing system for implementing the invention includes a processing unit 11, a system memory 12, and a system bus 10 that couples various system components including the system memory 12 to the processing unit 11.

The processing unit 11 can execute computer-executable instructions designed to implement features of this invention.

The system bus 10 may be any of several, types of bus structures including a memory bus or memory controller, a peripheral bus, and a local bus using any of a variety of bus architectures.

The system memory 12 includes read only memory (ROM) 12a and random access memory (RAM) 12b.

A basic input/output system (BIOS) 13a, containing the basic routines that help transfer information between elements within computer system, such as during start-up, may be stored in the ROM 12a.

The computing system may also include a storage unit, e.g., a hard disk drive 15 for reading from and writing to a hard disk, a magnetic disk drive 16 for reading from or writing to a magnetic disk, and an optical disk drive 17 for reading from or writing to an optical disk such as a CD-ROM or other optical media. The hard disk drive 15, the magnetic disk drive 16, and the optical disk drive 17 are connected to the system bus 10 by a hard disk drive interface 18, a magnetic disk drive-interface 19, and an optical drive interface 20, respectively.

Additionally, the computing system may further include an external memory 21 as the storage unit. The external memory 21 may be connected to the system bus 10 through an input/output interface 24.

The drives and their associated computer-readable media provide nonvolatile storage of computer-executable instructions, data structures, program modules, and other data for the computing system. Although the example environment described herein employs the hard disk 15, the magnetic disk 16 and the optical disk 17, other types of computer readable media for storing data can be used, including magnetic cassettes, flash memory cards, digital versatile disks, Bernoulli cartridges, RAMs, ROMs, and the like.

Program code means including one or more program modules, such as an operating system 13b, one or more application programs 13c, other program modules 13d, and program data 13e, may be stored on the hard disk 15, the magnetic disk 16, the optical disk 17, the ROM 12a, or the RAM 12b.

A user may enter commands and information into the computing system through other input device 22 such as a keyboard, a pointing device, a microphone, a joy stick, a game pad, or the like. This other input device 22 can be connected to the processing unit 11 through the input/output interface 24 coupled to the system bus 10. The input/output interface 24 may logically represent any of a wide variety of different interfaces, such as, for example, a serial port interface, a PS/2 interface, a parallel port interface, a universal serial bus (USB) interface, or an institute of electrical and electronics engineers (IEEE) 1394 interface (i.e., a FireWire interface), or may even logically represent a combination of different interfaces.

Additionally, the computing system may further include a display device 26 such as a monitor or LCD and/or an audio device 27 such as a speaker or a microphone, which are connected to the system bus 10 via a video/audio interface 25. The video/audio interface 25 may include high definition multimedia interface (HDMI), graphics device interface (GDI), or the like.

The computing system is connectable to networks, such as, for example, an office-wide or enterprise-wide computer network, a home network, an intranet, and/or the Internet. The computing system can exchange data with external sources, such as, for example, remote computer systems, remote applications, and/or remote databases over such networks.

The computing system includes a network interface 28, through which the computing system receives data from external sources and/or transmits data to external sources. The network interface 28 facilitates the exchange of data with remote devices. For example, if the computing system is the terminal device 300, the terminal device 300 may transmit or receive information to or from the beacon device 200 or the path management server 400 through the network interface 28. If the computing system is the beacon device 200 or the path management server 400, the beacon device 200 or the path management server 400 may transmit or receive information to or from the terminal device 300 through the network interface 28. The network interface 28 can logically represent one or more software and/or hardware modules, such as, for example, a network interface card and corresponding network driver interface specification (NDIS) stack.

Likewise, the computing system receives and/or transmits data from and/or to external sources through the input/output interface 24. The input/output interface 24 is coupled to a modem 23 (e.g., a standard modem, a cable modem, or a digital subscriber line (DSL) modem), through which the computing system receives data from and/or transmits data to external sources.

While FIG. 14 represents a suitable operating environment for the present invention, the principles of the present invention may be employed in any system that is capable of, with suitable modification if necessary, implementing the principles of the present invention. The environment illustrated in FIG. 14 is illustrative only and by no means represents even a small portion of the wide variety of environments in which the principles of the present invention may be implemented.

Various kinds of information generated during the execution of a beacon-based payment service at the beacon service system of this invention may be stored and accessed from any of the computer-readable media associated with the computing system as shown in FIG. 14. For example, portions of such modules and portions of associated program data may be included in the operating system 13b, the application programs 13c, the program modules 13d and/or the program data 13e, for storage in the system memory 12.

When a mass storage device such as the hard disk is coupled to the computing system, such modules and associated program data may also be stored in the mass storage device. In a networked environment, program modules depicted relative to the computing system, or portions thereof, can be stored in a remote computer system connected through the modem 23 or network interface 25 of the input/output interface 24. Execution of such modules may be performed in a distributed environment as previously described.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Also, although the present specifications describe that operations are performed in a predetermined order with reference to a drawing, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

While this disclosure has been particularly shown and described with reference to an exemplary embodiment thereof, it will be understood by those skilled in the art that various changes in form and details may be made therein without departing from the scope of this disclosure as defined by the appended claims.

The present invention has a good possibility of sales on the market or business and also has industrial applicability suitable for practical and apparent implementation.

What is claimed is:

1. A method for providing a travel path at a path management server, the method comprising steps of:
   collecting information about premises associated with beacon devices, the collected information including ending times of events at the premises;
   determining a subset of the premises to be visited by a user of a terminal device based at least on the collected information, determining an order of visiting the subset of premises by the user based on the ending times of the events so that first premises with an earlier event ending time is given a higher priority than second premises with a later event ending time;
   determining target beacons from the beacon devices respectively corresponding to the subset of the premises to be visited;

collecting one or more beacon signals received by the terminal device from, the beacon devices;
selecting a departure beacon from the one or more of the beacon devices by at least selecting, as the departure beacon, a beacon device that emits a beacon signal received with the greatest received signal strength by the terminal device;
estimating a current location of the terminal device as a location of the selected departure beacon;
determining intervening beacon devices of the beacon devices located between a first target beacon according to the order of visiting the subset of premises and the current location of the terminal device, and between each of the target beacons respectively according to the order of visiting the subset of premises;
establishing first links in paths to the target beacons through the intervening beacon devices according to the order of visiting the subset of premises responsive to determining absence of obstacles in the first links by referencing a map of a particular space in which the target beacons and intermediate beacons are installed;
preventing establishing second links in paths to the target beacons through intervening beacon devices according to the order of visiting the subset of premises responsive to determining presence of obstacles in the second links by referencing the map;
based on the established first links, determining one or more paths from the current location of the terminal device via the intervening beacons to the target beacons according to the determined order of visiting the subset of the premises;
assigning a weight value to each of the established first links representing a physical distance between the beacon devices respectively corresponding to each of the established first links;
for each of the one or more paths, summing up the assigned weight values of the established first links respectively corresponding to each of the one or more paths; and
selecting, from the one or more paths, a travel path having a lowest sum of the assigned weight values of the established first links.

2. The method of claim 1, further comprising step of:
receiving information about the subset of premises to be visited from the terminal device.

3. The method of claim 1, wherein the step of determining the subset of the premises to be visited includes step of, when beacon identification information of a beacon signal corresponding to a specific beacon device predetermined as the departure beacon is received from the terminal device, estimating the current location of the terminal device as a location of the specific beacon device.

4. A path management server comprising:
a communication circuit configured to transmit or receive data to or from a terminal device through a communication network; and
a control circuit configured to control the communication circuit and further configured to:
collect information about premises associated with beacon devices, the collected information including ending times of events at the premises;
determine a subset of the premises to be visited by a user of a terminal device based at least on the collected information,
determine an order of visiting the subset of premises by the user based on the ending times of the events so that first premises with an earlier event ending time is given a higher priority than second premises with a later event ending time;
determine target beacons from the beacon devices respectively corresponding to the subset of the premises to be visited;
collect one or more beacon signals received by the terminal device from, the beacon devices;
select a departure beacon from the one or more of the beacon devices by at least selecting, as the departure beacon, a beacon device that emits a beacon signal received with the greatest received signal strength by the terminal device;
estimate a current location of the terminal device as a location of the selected departure beacon;
determine intervening beacon devices of the beacon devices located between a first target beacon according to the order of visiting the subset of premises and the current location of the terminal device, and between each of the target beacons respectively according to the order of visiting the subset of premises;
establish first links in paths to the target beacons through the intervening beacon devices according to the order of visiting the subset of premises responsive to determining absence of obstacles in the first links by referencing a map of a particular space in which the target beacons and intermediate beacons are installed;
prevent establishing second links in paths to the target beacons through intervening beacon devices according to the order of visiting the subset of premises responsive to determining presence of obstacles in the second links by referencing the map;
based on the established first links, determine one or more paths from the current location of the terminal device via the intervening beacons to the target beacons according to the determined order of visiting the subset of the premises;
assign a weight value to each of the established first links representing a physical distance between the beacon devices respectively corresponding to each of the established first links;
for each of the one or more paths, sum up the assigned weight values of the established first links respectively corresponding to each of the one or more paths; and
select, from the one or more paths, a travel path having a lowest sum of the assigned weight values of the established first links.

5. The path management server of claim 4, wherein the control circuit is further configured to receive information about the subset of premises to be visited from the terminal device through the communication circuit.

6. The path management server of claim 4, wherein the control circuit is further configured to, when beacon identification information of a beacon signal corresponding to a specific beacon device predetermined as a departure beacon is received from the terminal device, estimate the current location of the terminal device as a location of the specific beacon device.

* * * * *